Figure 1:
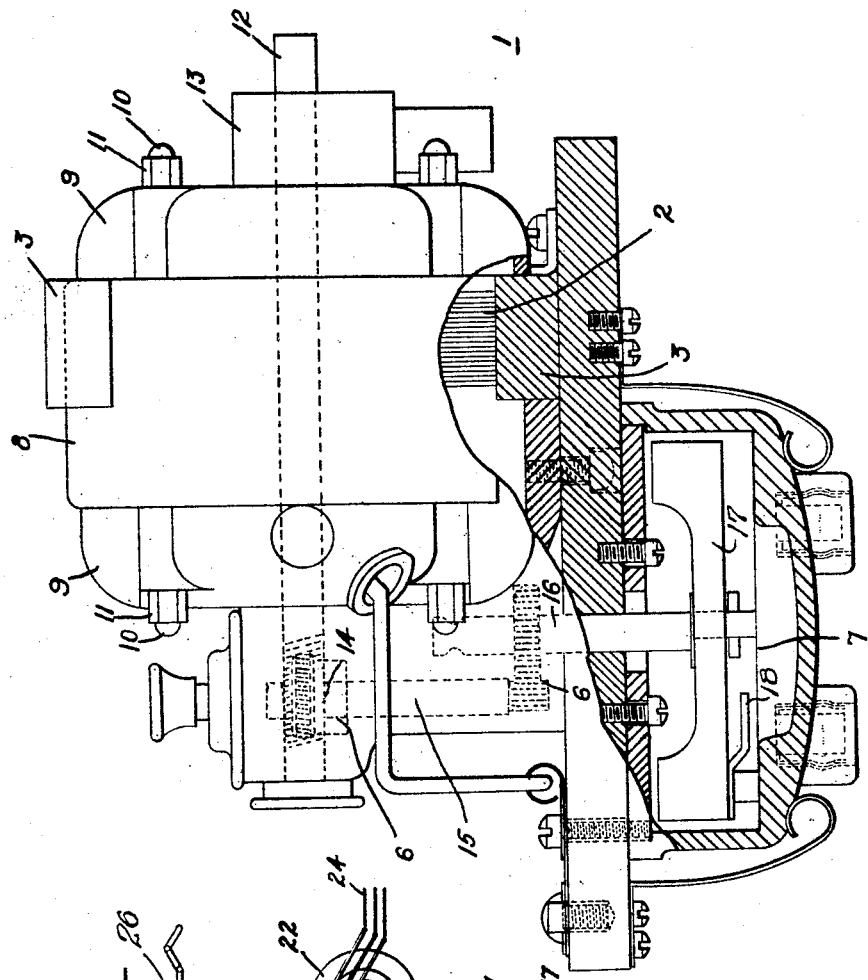

Feb. 28, 1928.

R. J. WENSLEY 1,660,900

RELAY

Original Filed April 16, 1918   2 Sheets-Sheet 1

WITNESSES:
Ed. V. Herron
J H Procter

INVENTOR
Roy J. Wensley
BY
Wesley G. Carr
ATTORNEY

Feb. 28, 1928.

R. J. WENSLEY 1,660,900

RELAY

Original Filed April 16, 1918  2 Sheets-Sheet 2

WITNESSES:
Ed. V. Herron
J A Procter

INVENTOR
Roy J. Wensley
BY
Wesley J. Carr
ATTORNEY

Patented Feb. 28, 1928.

1,660,900

UNITED STATES PATENT OFFICE.

ROY J. WENSLEY, OF EDGEWOOD PARK, PENNSYLVANIA, ASSIGNOR TO WESTINGHOUSE ELECTRIC & MANUFACTURING COMPANY, A CORPORATION OF PENNSYLVANIA.

RELAY.

Continuation of application Serial No. 228,822, filed April 16, 1918. This application filed November 22, 1924. Serial No. 751,709.

My invention relates to relays and particularly to relays for controlling rotary or synchronous converters. The present application is a continuation of my prior application, Serial No. 228,822, filed April 16, 1918.

One object of my invention is to provide a relay that shall be adapted to indicate the polarity and the condition of synchronism of a rotary converter.

Another object of my invention is to provide a relay, of the above-indicated character, that shall be adapted to automatically control the connection of a rotary converter to a circuit in accordance with its polarity and condition of synchronism.

A further object of my invention is to provide a polarized relay, of the above-indicated character, that shall be simple and inexpensive to construct and effective in its operation.

In automatic substations for railway systems in which rotary converters are adapted to be started and controlled in accordance with the load on the circuit, some means must be provided for controlling the polarity of the converter and for automatically controlling the connection of the converter to a circuit when a predetermined condition of polarity and synchronism obtains.

In view of the above, I provide a motor-type relay having a polarized field magnet and an armature that is connected across the direct-current end of the rotary converter. The field-magnet winding of the relay is connected across the direct-current circuit to which the converter is to be connected. A contact-making device is operatively connected, through a reduction gearing, to the armature of the relay. Since non-oscillating current will traverse the armature only when the converter is in synchronism with the alternating-current circuit, to which it is connected, and, since the desired polarity of the relay is determined by its polarized field magnet and field-magnet winding, the armature will rotate in one direction only when the converter is in synchronism and of the correct polarity When this condition obtains, the contact-making device is adapted to control the connection of the converter to the direct-current circuit. However, if the armature rotates in the other direction, it indicates incorrect polarity, and the contact-making device may be adapted to reverse the field-magnet winding of the converter to cause the same to slip a pole and thus obtain correct polarity. The armature will merely oscillate before the condition of synchronism is reached because, under this condition, an oscillating current traverses the same from the converter.

Figure 2:
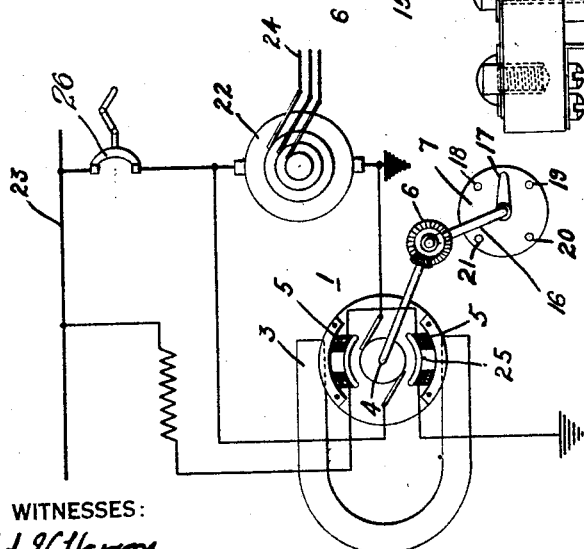
Figure 3:
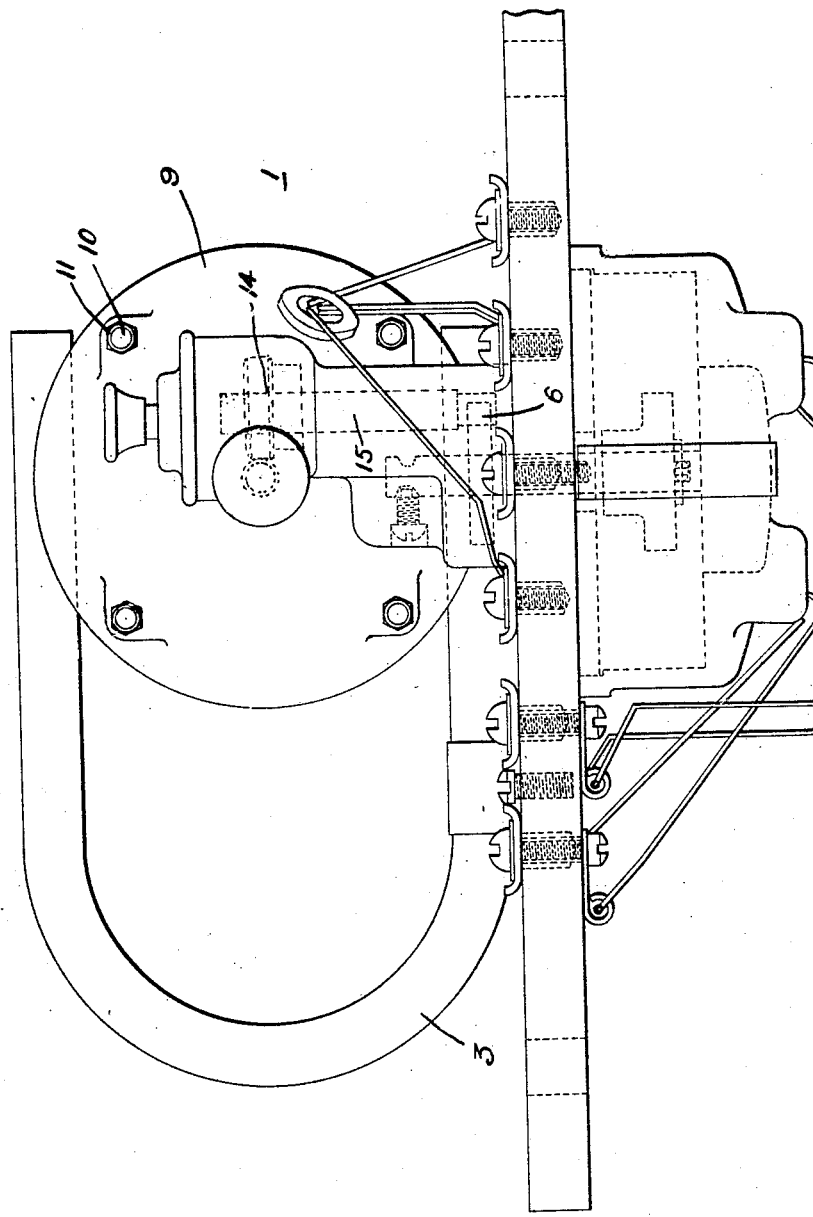

In the accompanying drawings, Figure 1 is a side view, partially in section and partially in elevation, of a polarized relay embodying my invention; Fig. 2 is a diagrammatic view of a relay device embodying my invention, and Fig. 3 is an end elevational view of the relay shown in Fig. 1.

The polarized relay 1, embodying my invention, comprises, in general, a split magnetizable core member 2, a polarized magnet 3, an armature 4, field-magnet windings 5, a reduction gearing 6 and a contact-making device 7.

The split core member 2 of the motor relay is constructed by cutting away portions of the core member of an ordinary direct-current motor, and the polarized magnet 3 is disposed in slots cut in the two parts of the same. The two portions of the core member are secured to each other through the frame 8 and end bells 9 by bolts 10 and nuts 11. The armature 4 is mounted on a shaft 12 that is supported by bearing housings 13 on the end bells 9. The shaft 12 is connected, through worms 14, to a shaft 15, and the shaft 15 is connected, through the reduction gearing 6, to a shaft 16 upon one end of which is mounted the contact member 17 of the contact-making device 7. The contact member 17 is adapted to engage the stationary contact members 18, 19, 20 and 21 for the purpose of controlling the circuits of relays (not shown).

A rotary converter 22 is adapted to be automatically connected to a direct-current circuit 23 when the rotary converter 22 is of the correct polarity and is operating in synchronism with the alternating-current circuit 24 to which it is connected. The field-magnet windings 5 that are disposed around pole pieces 25 of the motor relay are connected in series across the circuit 23 and are adapted to assist the magnetism of the permanent magnet 3. The armature 4 of the motor relay is connected across the direct-current end of the converter 22.

The converter 22 is adapted to be started automatically when the load on the circuit 23 increases beyond a predetermined value, in a manner substantially as shown in Patent No. 1,435,229, issued November 14, 1922, to F. C. Hanker and C. M. Moss and assigned to the Westinghouse Electric and Manufacturing Company, and is adapted to be connected to the circuit 23 only when it is running in synchronism with the circuit 24 and has the same polarity as the circuit 23. Since the armature 4 is connected across the direct-current end of the converter 22, direct current will traverse the armature 4 only when a condition of synchronism obtains in the converter 22. Thus, the armature 4, in co-operation with the unidirectional field of the motor, will rotate only when synchronism obtains in the converter and, under other conditions, will merely oscillate through a relatively small angle by reason of the oscillating current traversing the armature 4. However, if the polarity of the direct-current end of the converter 22 is correct, the armature 4 will turn in one direction to effect successive engagement between the contact members 17 and the stationary contact members 18 and 19. When this condition obtains, relays (not shown) may be successively operated to close a circuit interrupter 26 and thereby connect the converter 22 to the circuit 23. If the polarity of the converter 22 and the condition of synchronism is incorrect, the armature 4 will rotate in the opposite direction and thus cause the contact members 17 to engage the contact members 21 and 20 in succession and thereby successively energize two other relays (not shown) which may be adapted to reverse the field-magnet winding (not shown) of the converter 22 and thereby cause the same to slip a pole and obtain correct polarity. When the converter 22 attains correct polarity, under this condition, the armature 4 will immediately reverse and cause the contact member 17 to engage the contact members 18 and 19 successively and thereby control the closing of the circuit interrupter 26, as hereinbefore set forth. In other words, the relay 1 may be used in connection with the system set forth in the above mentioned application.

Since the speed of the armature 4 is relatively high, it is desirable to provide the reduction gearing 6 in order that the contact member 17 shall embody a time element in its operation to secure effective engagement with the stationary contact members and positive operation of the relays that are adapted to be controlled by the contact-making device 7. The controlling mechanism for reversing the field-magnet winding of the converter 22 and for controlling the operation of the circuit interrupter 26 are not shown because they are well known in the art, as set forth in the above-indicated patent and in my Patent No. 1,442,202, issued January 16, 1923.

My invention is not limited to specific construction illustrated, as it may be variously modified without departing from the spirit and scope of the invention, as set forth in the appended claims.

I claim as my invention:

1. A polarity relay for use with a rotary converter to indicate the polarity developed at the commutator when the rotary converter has attained synchronous speed after being started from its alternating current end, comprising a motor device provided with a rotating armature to be energized from the converter commutator and cooperating stationary field magnets for providing a field flux, and a permanent magnet connected to the field magnets to maintain a definite magnetic bias in said magnets during the starting operation of the converter to prevent the alternating currents supplied to the armature by the converter commutator during starting conditions, from establishing a remanent flux of improper polarity in the field magnets, and means controlled by the armature of the motor device after the converter attains synchronous speed for operating a circuit controlling device to control external circuits, dependent upon the polarity attained in the rotary converter upon attaining synchronous speed.

2. A motor relay comprising a small motor provided with a rotating armature and field-magnet pole elements connected by a permanent polarized magnet to provide a definite polarity bias for determining the direction of rotation of the armature, depending upon the polarity of a connected circuit, a base for the motor, a shaft operatively connected to the motor and extending through the base, and a distributor on the lower side of the base operatively connected to the shaft.

In testimony whereof, I have hereunto subscribed my name this 5th day of November, 1924.

ROY J. WENSLEY.